United States Patent [19]

Espenscheid et al.

[11] 3,959,452

[45] May 25, 1976

[54] PROCESS FOR REMOVING HYDROGEN SULFIDE FROM CONTAMINATED GAS

[75] Inventors: Wilton F. Espenscheid, Princeton; Tsoung-Yuan Yan, Trenton, both of N.J.

[73] Assignee: Mobil Oil Corporation, New York, N.Y.

[22] Filed: May 15, 1975

[21] Appl. No.: 577,572

[52] U.S. Cl. .......................... 423/573 G; 423/226; 423/567 R; 423/232
[51] Int. Cl.² ........................................ C01B 17/04
[58] Field of Search .......... 423/226, 232, 223, 567, 423/571, 573, 575, 236; 55/73

[56] References Cited
UNITED STATES PATENTS

| | | | |
|---|---|---|---|
| 1,542,971 | 6/1926 | Sperr et al. | 423/232 |
| 1,653,933 | 12/1927 | Sperr et al. | 423/232 |
| 3,887,682 | 6/1975 | Kumata et al. | 423/236 X |
| 3,904,734 | 9/1975 | Gosden et al. | 423/236 |
| 3,914,387 | 10/1975 | Von Jordan et al. | 423/242 |

*Primary Examiner*—G. O. Peters
*Attorney, Agent, or Firm*—Charles A. Huggett; Michael G. Gilman; Vincent J. Frilette

[57] ABSTRACT

The thiosulfate-containing purge stream generated in a Stretford-type process for purifying a hydrogen sulfide contaminated gas stream is treated with phosphoric or sulfuric acid and then with lime to recover vanadate salts, anthraquinone disulfonic acid salts, and alkali, for reuse in the process.

10 Claims, 3 Drawing Figures

Conversion of Thiosulfate

Solubility of Calcium and Sulfate Ions vs. pH

PROCESS FOR REMOVING HYDROGEN SULFIDE FROM CONTAMINATED GAS

BACKGROUND OF THE INVENTION

1. Field of the Invention

This invention is concerned with the purification of sulfur-contaminated gas streams. It is particularly concerned with an improved process for removing low concentrations of hydrogen sulfide contaminant in a waste gas stream by contact with a regenerable, reactive aqueous sorbent, the improvement residing in a novel treatment of sorbent degraded by excess thiosulfate content. The novel treatment recovers chemical values and mitigates disposal problems.

2. Prior Art

Low concentrations of sulfur contaminants occur in gas streams such as natural gas, coke oven gas, and the tail gas from the Claus process. These contaminants are usually undesirable for one reason or another. In particular, in the Claus process which is widely used in petroleum refineries to convert by-product hydrogen sulfide to sulfur, large volumes of waste tail gas are generated which may contain up to about 2.0 wt.% sulfur contaminant. Directly discharging this tail gas to the atmosphere results in pollution problems, and increasing numbers of communities are requring that the contaminant level be drastically reduced prior to discharge.

A recently developed and highly effective process, known as the Stretford Process, has been used to remove low concentrations of sulfur contaminants from the gas streams. In this process, if the sulfur contaminant is not all present as hydrogen sulfide, it is first converted to this compound by the Bevon process, for example, which utilizes catalytic hydrogenation with a cobalt-molybdenum type catalyst. The hydrogen sulfide contaminated gas stream is then contacted with an aqueous alkaline sodium carbonate-bicarbonate solution that contains salts of oxyacids of pentavalent vanadium and the salts of anthraquinone and/or hydroanthraquinone disulfonic acids (hereinafter referred to simple as A.D.A. and reduced A.D.A., respectively). Substantially all of the hydrogen sulfide is converted to elemental sulfur which is recovered. This oxidation of hydrogen sulfide occurs with a concomitant reduction of the pentavalent vanadium to tetravalent form, and some reduction of the A.D.A. may also occur. A properly treated gas stream will contain less than about 0.002 wt.% residual sulfur contaminant. After separation of the elemental sulfur, the spent aqueous sorbent containing tetravalent vanadium is regenerated with oxygen gas or air to form reactive aqueous sorbent which is recycled to the sorption step. The net effect of the cycle is the indirect oxidation of the hydrogen sulfide by oxygen gas to form water and elemental sulfur which is recovered.

In practice, the described process has been found to perform its intended function of removing substantially all of the sulfur in a waste gas stream or other gas stream extremely well. Nonetheless, there is a problem associated with this process due to the fact that as much as about 5% of the sorbed sulfur contaminant is not recovered in the form elemental sulfur but, instead, forms thiosulfate and, to a lesser extent, other water-soluble oxysulfur anions, such as sulfate. The reaction path by which thiosulfate forms is not entirely clear, but some undoubtedly is formed by the direct oxidation of the hydrosulfide ion. Another contribution may be from the known reaction of sulfur with sodium carbonate. A fraction of the thiosulfate, in turn, is converted to sulfate in the presence of A.D.A. or reduced A.D.A. and the oxygen used as regenerant. Regardless how formed, thiosulfate and related compounds accumulate in the regenerable, reactive aqueous sorbent with adverse effects. Thus, either the periodic replacement of the entire sorbent or the withdrawal of a purge stream is required to maintain the concentration of these compounds at a tolerable level in the system. In general, sodium thiosulfate levels in excess of about 25 wt.%, as the pentahydrate, are very undesireable because both A.D.A. and the vanadate salts are largely salted out at these levels. Since either complete or partial replacement of the oxysulfur anion-loaded sorbent is, in effect, a purging of the system, the term "purge stream", as used herein, is to be understood to refer to either or both modes of replacement. Valuable soda, A.D.A. and vanadium compounds are lost with the removed sorbent, which is a disadvantage of the process. More important, however, is that the removed, degraded sorbent presents a serious disposal problem since it has a high B.O.D. (Biological Oxygen Demand) by virtue of its high concentration of thiosulfate.

It is an object of this invention to provide an improved process for the removal of sulfur contaminant from gas streams. It is a further object of this invention to provide a means for reducing the losses of vanadium and A.D.A. in the purge stream of the Stretford process. It is a further object of this invention to provide a means for converting the thiosulfate purge stream in the Stretford process to innocuous insoluble calcium salts and concomitantly recover A.D.A. and sodium hydroxide. Other objects will become evident from consideration of this entire specification including the claims thereof.

BRIEF SUMMARY OF THE INVENTION

In this invention, the purge stream from the Stretford process, which typically contains 20–30% sodium thiosulfate as pentahydrate, with some sodium sulfate present, about 2% sodium bicarbonate, about 0.2% vanadate, and about 0.2% A.D.A., is treated with sulfuric acid or phosphoric acid to decompose the thiosulfate to elemental sulfur and $SO_2$, according to the equation:

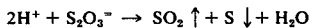

$$2H^+ + S_2O_3^- \rightarrow SO_2 \uparrow + S \downarrow + H_2O$$

This reaction proceeds in nearly stoichiometrically, as shown in FIG. 2. The acidified solution is blown with steam to remove substantially all of the $SO_2$ and the elemental sulfur is separated. The sodium sulfate or sodium phosphate solution is then treated with sufficient calcium hydroxide to convert substantially all of the sodium sulfate or phosphate to sodium hydroxide and precipitate calcium sulfate or calcium phophate, depending on the acid utilized to decompose the thiosulfate. The slurry is separated into a solids-rich fraction, which may be easily discarded, and a clear supernatant liquid which contains sodium hydroxide, A.D.A. and vanadium salts, which liquid is recycled to the scrubber. The $SO_2$ separated from the acidified solution is preferably recycled to the Claus plant when the process of this invention is used to purify the tail gas from such a plant. Alternatively, it may be vented when feasible, or reduced with hydrogen to $H_2S$ and recycled to the scrubber.

DESCRIPTION OF SPECIFIC EMBODIMENTS

Figure 1:
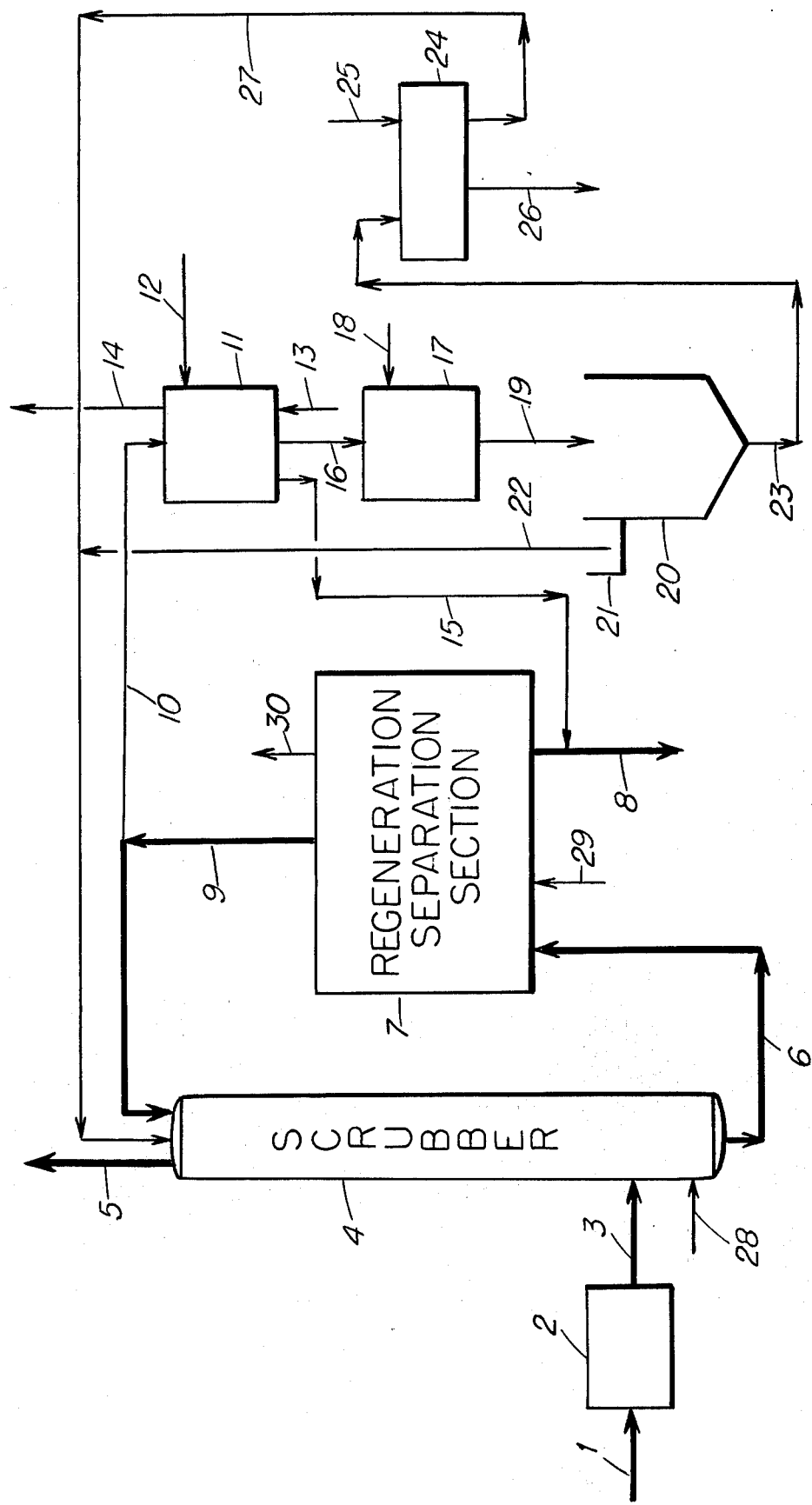
FIG. 1 is a flow diagram illustrating the novel means for treatment of the purge stream.
Figure 2:
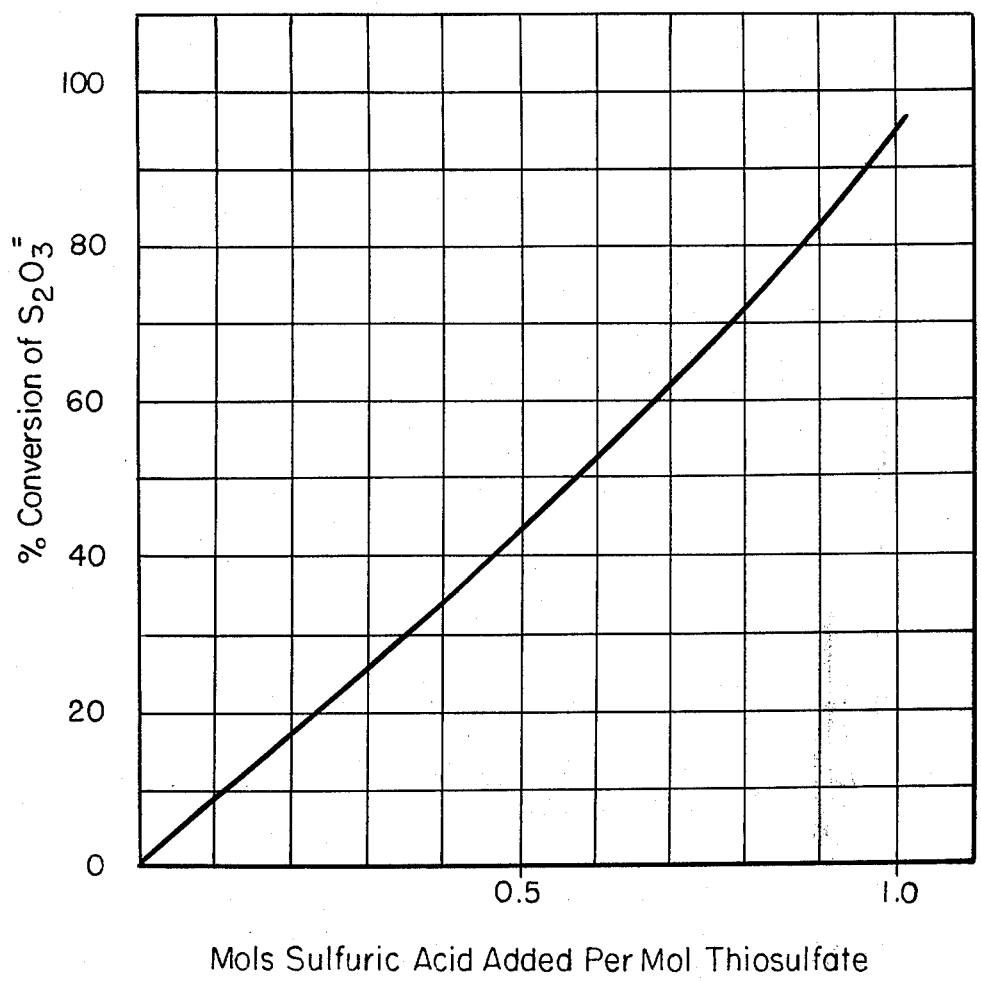
FIG. 2 shows the conversion of thiosulfate on reaction with sulfuric acid.
Figure 3:
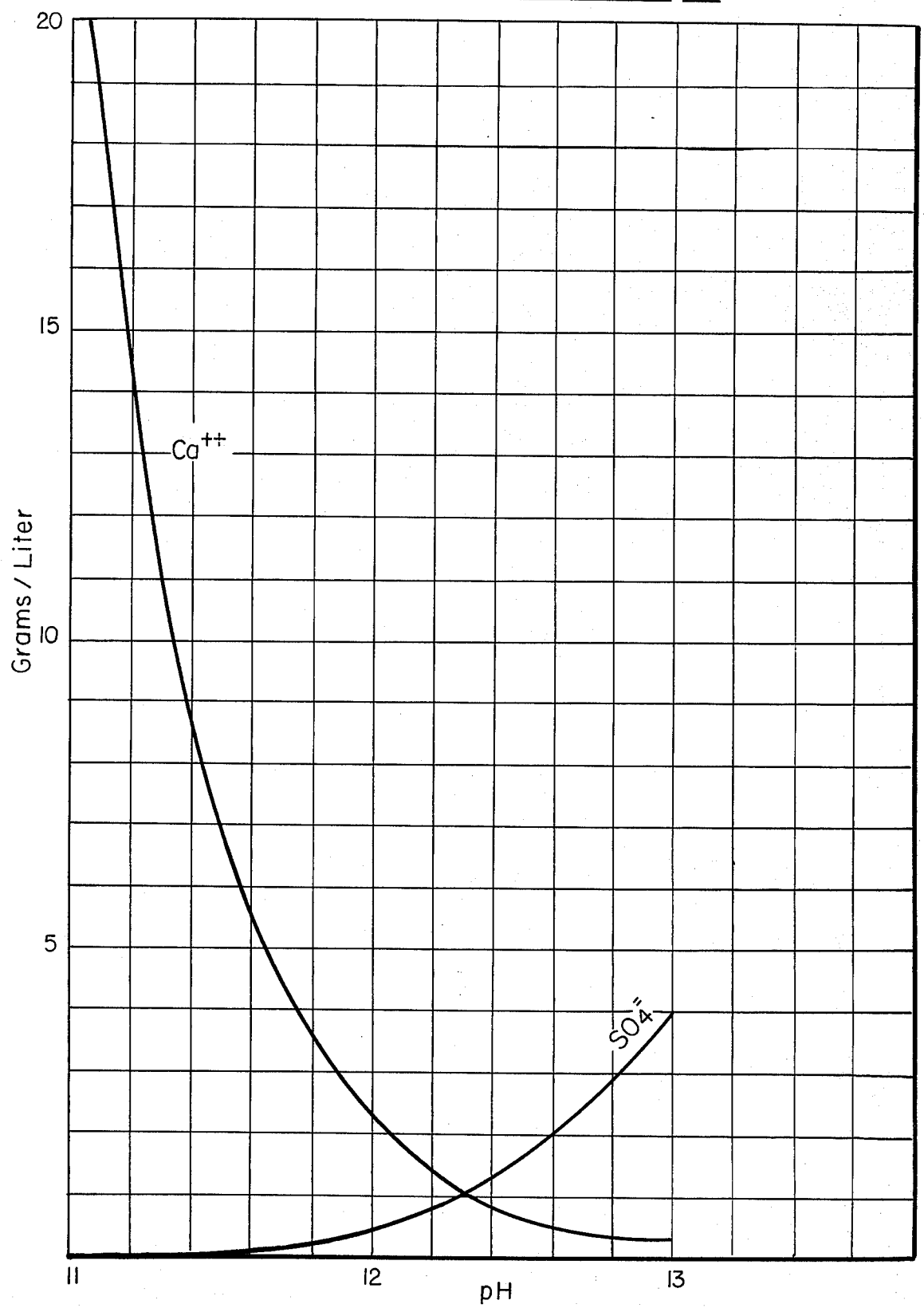
FIG. 3 illustrates the solubility of calcium and sulfate ions vs. pH.

This invention will now be described by reference to FIG. 1 of the drawing. A sulfur contaminated gas stream, such as the tail gas from the Claus process, which may contain up to about 2.0 wt.% sulfur as $SO_2$, together with sufficient added hydrogen to reduce substantially all of the sulfur contaminant to hydrogen sulfide, is fed through line 1 to a catalytic reduction unit 2. The contaminated gas stream with the contaminant now in the form of hydrogen sulfide is passed via line 3 to one or more scrubber units, shown in the drawing as a single scrubber 4 where the contaminant is sorbed in the regenerable, reactive aqueous sorbent. The purified gas exists through line 5, and the aqueous sorbent and suspended sulfur passes via line 6 to a regeneration-separation section 7 from which regenerated aqueous sorbent is passed via line 9 and returned to the scrubber 4. Sulfur is recovered from the regeneration separation section 7 via line 8. A purge stream, which may be drawn off from line 6 but is preferably drawn from line 9 as shown, is passed via line 10 to a neutralizer 11. Sulfuric acid or phosphoric acid is introduced into the neutralizer 11 via line 12 in sufficient quantity to decompose substantially all of the thiosulfate. The acidified mixture is blown with steam or hot flue gas introduced via line 13 to strip it of sulfur dioxide with exits via line 14. Flocculated sulfur is removed via line 15 by decantation or any other means, and may be added to the sulfur recovered via line 8. The acidified solution, consisting of sodium sulfate or sodium phosphate along with some sodium sulfite, A.D.A., and vanadium compounds is passed via line 16 to causticizer 17. Sufficient lime i.e., calcium hydroxide or equivalent, is added via line 18 to neutralize the acid added via line 12 and any sulfate that may have been present in the purge stream. The slurry of insoluble calcium sulfate and/or phosphate is passed via line 19 to a thickener 20 provided with means for segregating clear supernatant liquor 21. The clear supernatant liquor is passed via line 22 into line 27 from where it is returned to the scrubber. The concentrated slurry may be discharged to a disposal pit, or as shown in the Figure, it may be passed via line 23 to a back-in filter 24 where it is washed with water introduced via line 25 to recover additional caustic soda and A.D.A. The washed filter cake is passed via line 26 to a disposal pit. Make-up water, soda ash and vanadium salts, and acids that may be needed to adjust pH of the sorbent, are introduced as needed to the scrubber section 4 via line 28. Air or oxygen gas is provided to the regeneration separation section 7 via line 29 and unconsumed oxygen, if any, and/or nitrogen are vented via line 30.

In treatment of the acidified purge stream to strip it of sulfur dioxide, it is important to treat with steam, hot flue gas, or by boiling, under such conditions of time and temperature so as to remove substantially all sulfur dioxide, since otherwise the consumption of lime will be increased as will be too the amount of insoluble calcium salts formed.

Although this invention has been described with reference to the Stretford process as it is currently practiced, it is to be understood that this invention is applicable to variants of the process which also utilize a regenerable, reaction aqueous sorbent. For example, other redox metal-containing couples may be substituted for the vanadate salt which provides the pentavalent-tetravalent vanadium couple or of other oxygen-transfer organic redox couples for the A.D.A., or combinations of these with one another, in an aqueous alkaline medium, provided these form a regenerable, reactive aqueous sorbent. Among the metal-containing couples contemplated are those provided by the appropriate oxyanions of metals of group VB and group VIB of the periodic table, and the oxyanions of arsenic which exists in the trivalent and pentavalent state. Iron, in which the ferrous-ferric transition exists, also may be used, provided it is used in the presence of a sequestering agent to prevent precipitation of iron oxide. In addition to the sodium salt of A.D.A., (usually the sodium salt of anthraquinone 2:7 disulfonic acid), other oxygen-transfer organic redox couples containing the anthraquinone or naphthaquinone structure may be used. Furthermore, the organic redox couple may be used in the absence of a redox metal-containing couple, although this tends to make excessive amounts of thiosulfate. In addition to the reactive reagents and alkaline salts, additives such as citrate or tartrate salts and/or phosphate salts as described in copending U.S. Pat. application Ser. No. 577,573 filed May 15, 1975, may be present in the reactive, regenerable aqueous sorbent. It is to be understood, of course, that the contemplated reactant reagents are those that remain soluble through the complete cycle, i.e. the reaction and regeneration steps, since otherwise occlusion by elemental sulfur and loss of reagent results. With all of the contemplated variants of the sorbent, one would expect, to a greater or lesser degree, that the hydrogen sulfide would react to form greater or lesser amounts of thiosulfate along with elemental sulfur, and that the disposal problem would be substantially ameliorated by the use of the present invention.

What is claimed is:

1. In the process of purifying a hydrogen sulfide contaminated gas by indirectly oxidizing the hydrogen sulfide with oxygen gas to form elemental sulfur and purified gas, said process comprising recycling a reactive, regenerable aqueous sorbent as means for effecting said indirect oxidation, and wherein a stream of said recycled aqueous sorbent containing thiosulfate is purged, the improvement, whereby recovering reactive reagents from said purge stream, which comprises:

acidifying said purge stream with sulfuric or phosphoric acid whereby decomposing said thiosulfate;

alkalizing the acidified purge stream with calcium hydroxide whereby forming a precipitate of insoluble calcium salts; and recovering an alkaline solution comprising reactive reagents from said alkalized purge stream.

2. The process of claim 1 wherein sulfuric acid is used in said acidifying step.

3. The process of claim 1 wherein phosphoric acid is used in said acidifying step.

4. The process of claim 1 wherein said recovered alkaline solution contains oxyanions of vanadium.

5. The process of claim 1 wherein said recovered alkaline solution contains the sodium salts of A.D.A.

6. The process of claim 1 wherein said recovered alkaline solution is substantially free of said thiosulfate.

7. The process of claim 1 including the additional step of returning said recovered alkaline solution to said recycling step.

8. The process of claim 6 including the additional step of returning said recovered alkaline solution to said recycling step.

9. A method for removing thiosulfate contaminant from an alkaline solution comprising the sodium salts of A.D.A. and an oxyanion of vanadium, which comprises: acidifying said alkaline solution, whereby elemental sulfur and $SO_2$ are formed; removing said elemental sulfur and $SO_2$; alkalizing the remainder of said acidic solution with calcium hydroxide; and recovering an alkaline solution of said sodium salts substantially free of thiosulfate.

10. The method of claim 9 wherein sulfuric acid is used to acidify said alkaline solution.

* * * * *